United States Patent
Lee

(10) Patent No.: US 9,242,264 B2
(45) Date of Patent: Jan. 26, 2016

(54) WATER JET DEVICE AND WATER DANCE SPEAKER

(71) Applicant: ATAKE DIGITAL TECHNOLOGY (SHENZHEN) CO., LTD., Shenzhen, Guangdong Province (CN)

(72) Inventor: Kuo Tsai Lee, Shenzhen (CN)

(73) Assignee: ATAKE DIGITAL TECHNOLOGY (SHENZHEN) CO., LTD., Shenzhen, Guangdong Province (CN)

( * ) Notice: Subject to any disclaimer, the term of this patent is extended or adjusted under 35 U.S.C. 154(b) by 24 days.

(21) Appl. No.: 14/315,325

(22) Filed: Jun. 25, 2014

(65) Prior Publication Data

US 2014/0306025 A1 Oct. 16, 2014

Related U.S. Application Data

(63) Continuation of application No. PCT/CN2013/079669, filed on Jul. 19, 2013.

(30) Foreign Application Priority Data

Feb. 4, 2013 (CN) .......................... 2013 1 0042433

(51) Int. Cl.

| B05B 17/08 | (2006.01) |
| --- | --- |
| B05B 3/02 | (2006.01) |
| B05B 15/04 | (2006.01) |
| F21W 121/02 | (2006.01) |
| F21Y 101/02 | (2006.01) |

(52) U.S. Cl.
CPC . *B05B 17/08* (2013.01); *B05B 3/02* (2013.01); *B05B 15/0406* (2013.01); *F21W 2121/02* (2013.01); *F21Y 2101/02* (2013.01)

(58) Field of Classification Search
CPC ............................. B05B 17/08; B05B 17/085
USPC .................................... 239/16, 17, 18, 22, 23
See application file for complete search history.

(56) References Cited

U.S. PATENT DOCUMENTS 6,276,612 B1 * 8/2001 Hall ........................ B05B 17/08
239/101
6,332,282 B1 12/2001 Lin
(Continued)

FOREIGN PATENT DOCUMENTS

| CN | 2865864 Y | 2/2007 |
| CN | 201470558 U | 5/2010 |

(Continued)

*Primary Examiner* — Davis Hwu
(74) *Attorney, Agent, or Firm* — Cheng-Ju Chiang

(57) ABSTRACT

A water jet device and a water dance speaker comprising the water jet device are disclosed. The water jet device comprises a base container, a drive unit and fans driven by the drive unit, the drive unit being mounted externally to a bottom of the base container, while the fans internally to the bottom of the base container. A cover plate, disposed on the base container to engage therewith, comprises via holes thereon and coordinates with the base container to form a chamber to contain liquids. On the side of the cover plate away from the base container are formed protrusions vertical to the cover plate, a first via hole penetrating each of the protrusions. The present invention provides a water jet device capable of recycling water resources and preventing water leak. Therefore, the water jet device as disclosed is safe in use and possesses practical applicability.

15 Claims, 3 Drawing Sheets

(56) References Cited

U.S. PATENT DOCUMENTS

| | | | |
|---|---|---|---|
| 6,921,023 B1 * | 7/2005 | Bright | A01K 63/00 137/563 |
| 2002/0113138 A1 | 8/2002 | Shih | |
| 2002/0117555 A1 | 8/2002 | Lin | |
| 2006/0175424 A1 * | 8/2006 | Tatum | B05B 17/08 239/18 |
| 2010/0276508 A1 * | 11/2010 | Davies | B05B 17/08 239/18 |
| 2013/0126633 A1 * | 5/2013 | Powell | B05B 17/00 239/18 |

FOREIGN PATENT DOCUMENTS

| | | |
|---|---|---|
| CN | 202238485 U | 5/2012 |
| CN | 103111395 A | 5/2013 |
| CN | 203155456 U | 8/2013 |
| WO | PCT/CN2013/079669 | 7/2013 |

* cited by examiner

WATER JET DEVICE AND WATER DANCE
SPEAKER

CROSS-REFERENCE TO RELATED
APPLICATION

This application is a continuation application of International (PCT) Patent Application No. PCT/CN2013/079669 filed on Jul. 19, 2013, now pending and designating the United States, which also claims benefit of China Patent Application No. 201310042433.9, filed on Feb. 4, 2013. The entireties of the above-mentioned patent applications are hereby incorporated by reference herein and made a part of this specification.

FIELD OF THE INVENTION

The present invention relates to the field of water jet, and more particularly to a water jet device and a water dance speaker.

BACKGROUND OF THE INVENTION

A fountain speaker creates water dance effect varied with the melody of music or with the rhythm of an external sound. A user can enjoy at the same time the water dance and the varying colorful lights. However, the conventional fountain speakers suffer from many drawbacks, such as water leak that burns a circuit or undesirable water jet effect.

SUMMARY OF THE INVENTION

In view of the above, the object of the present invention is to provide a water jet device, which produces desirable water jet effect, and meanwhile is safe in use and recycles water resources.

To fulfill the aforesaid object, the present invention proposes a water jet device, comprising: a base container, a drive unit and fans driven by the drive unit. The drive unit is mounted externally to a bottom of the base container, while the fans are mounted internally to the bottom of the base container. A cover plate, disposed on the base container to engage therewith, comprises via holes thereon and coordinates with the base container to form a chamber to contain liquids. On the side of the cover plate away from the base container are formed protrusions vertical to the cover plate, a first via hole penetrating each of the protrusions.

Preferably, the drive unit comprises a body and a first fixing plate driven by the body, a first magnetic body being disposed on the first fixing plate. A fixing pole is internally formed on the bottom of the base container and mounted to the fans, a second magnetic body being disposed on the fans.

Preferably, the first magnetic body and the second magnetic body are aligned with each other.

Preferably, a light emitting component is externally mounted to the bottom of the base container, aligned with the first via holes penetrating the protrusions.

Preferably, the device further comprises a first housing, which coordinates with the base container to form an airtight room.

Preferably, a baffle is provided between the first housing and the base container, a second via hole being disposed on the baffle to running fit with the protrusions and penetrate the baffle.

Preferably, a protective sheet is retained between the baffle and the cover plate, with support legs being disposed on both sides of the protective sheet.

Disclosed in the present invention is also a water dance speaker, comprising a water jet device, and a second housing adapted for accommodating the water jet device, the second housing comprising a power source interface and a speaker. The water jet device comprises a base container, a drive unit and fans driven by the drive unit. The drive unit is mounted externally to a bottom of the base container, while the fans are mounted internally to the bottom of the base container. A cover plate, disposed on the base container to engage therewith, comprises via holes thereon and coordinates with the base container to form a chamber to contain liquids. On the side of the cover plate away from the base container are formed protrusions vertical to the cover plate, a first via hole penetrating each of the protrusions.

Preferably, the second housing comprises a control circuit module adapted for controlling operations of the water jet device and the speaker, the control circuit module comprising a power source input end connected with the power source interface.

As is disclosed herein above, a water jet device is provided in the present disclosure, which comprises a base container, a drive unit and fans driven by the drive unit. The drive unit is mounted externally to a bottom of the base container, while the fans are mounted internally to the bottom of the base container. A cover plate, disposed on the base container to engage therewith, comprises via holes thereon and coordinates with the base container to form a chamber to contain liquids. On the side of the cover plate away from the base container are formed protrusions vertical to the cover plate, a first via hole penetrating each of the protrusions. This water jet device is capable of performing a water dance show while recycling used water resources and perfectly avoiding water leaks. Therefore, the water jet device of the present disclosure is safe in use and possesses practice applicability.

The realization, function and merits of the invention will be more apparent from the following descriptions to the embodiments with reference to the drawings.

DETAILED DESCRIPTION OF THE INVENTION

The technical solutions employed in the present disclosure will be set forth hereunder in greater details by referencing to particular embodiments accompanied by the drawings. These embodiments should be construed to serve the purpose of illustrating the invention only, rather than limiting the scope of the invention.

Figure 1:
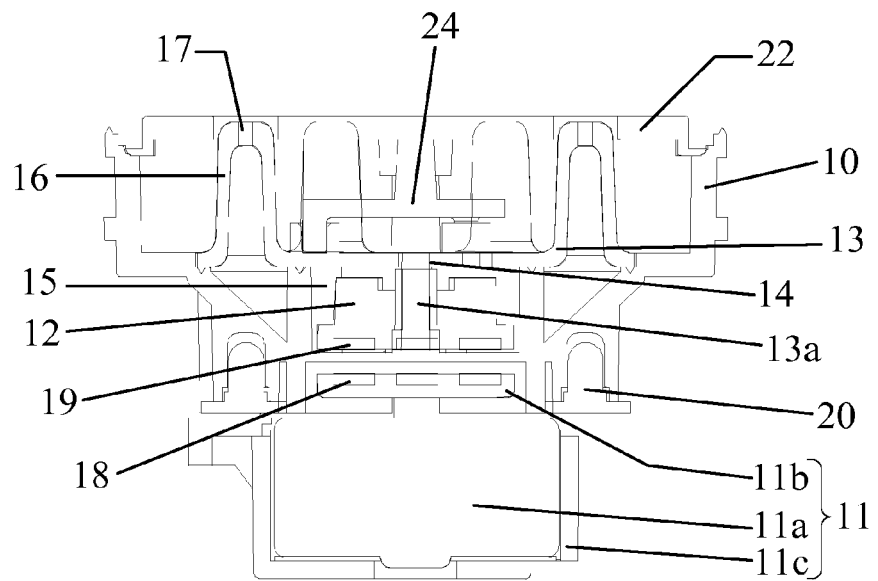
FIG. 1 is a perspective view of a water jet device according to one embodiment of the present disclosure.
Figure 2:
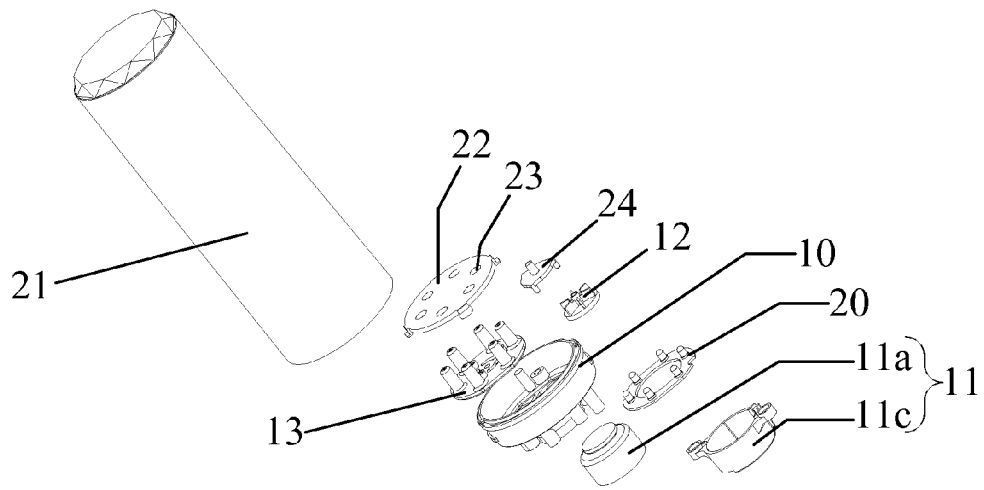
FIG. 2 is a perspective exploded view of a water jet device according to another embodiment of the present disclosure.

Reference is now made to FIGS. 1 and 2, which respectively show a water jet device according to one embodiment of the present disclosure, and breakdown of a water jet device according to another embodiment. A water jet device is provided, which comprises: a base container 10, a drive unit 11, fans 12 driven by the drive unit 11. The drive unit 11 is mounted externally to the bottom of the base container 10, while the fans 12 are mounted internally to the bottom of the base container 10. A cover plate 13 is disposed on the base container 10 to engage therewith. The cover plate 13 comprises via holes 14 thereon and coordinates with the base container 10 to form a chamber 15 to contain liquids. On the side of the cover plate 13 away from the base container 10 are formed protrusions 16 vertical to the cover plate. A first via hole 17 is formed to penetrate each of the protrusions 16. In this embodiment, the base container 10 is made of a transparent material. The chamber 15 formed by the base container 10 contains a cylindrical spacer plate which divides the chamber 15 into an inner chamber and an outer chamber. The inner chamber is designed to accommodate the fans 12 and liquids, which are preferably water according to this embodiment of the invention. Of course, it would be understood that other liquids, such as oil, may also be used. A number of water jet holes are formed on the spacer plate to guide water from the inner chamber to the outer chamber when the fans 12 are rotating. The exterior walls of the outer chamber extend upward from the bottom of the chamber 15 in an inclined pathway, which reduce the resistance exerted on the upflowing water and save spaces as well. The cover plate 13 fits perfectly with the opening of the chamber 15 on the bottom to form an airtight room, which facilitates retaining pressure in the chamber. The protrusions 16 formed on the cover plate 13 serve as nozzles disposed on the very front of the outer chamber. The drive unit 11, which is externally mounted to the bottom of the base container 11, is pivoted to the fans 12 situated within the base container. The drive unit is preferably a motor according to this embodiment. The fans 12 may be sized and shaped according to circumstances. When electrified, the motor rotates the fans 12 to drive water from the inner chamber to the outer chamber, where water climbs along the inclined exterior walls to be ejected from the first via holes 17 of the protrusions 16. The exterior walls are designed such that they not only have an inclined profile to reduce resistance on the flowing water and make it easier for the water to be ejected, thereby reducing the motor power and saving resources, but also expand the area of protrusions 16 to the most degree, so that the smaller motor could provide water supply to the protrusions 16 with larger area. In addition, the water jet holes 14 facilitate the ejected water returning to the chamber 15, thereby recycling water resources.

A water jet device is provided in the present disclosure, which comprises: a base container 10, a drive unit 11, fans 12 driven by the drive unit 11. The drive unit 11 is mounted externally to the bottom of the base container 10, while the fans 12 are mounted internally to the bottom of the base container 10. A cover plate 13 is disposed on the base container 10 to engage therewith. The cover plate 13 comprises via holes 14 thereon, and coordinates with the base container 10 to form a chamber 15 to contain liquids. On the side of the cover plate 13 away from the base container 10 are formed protrusions 16 vertical to the cover plate 13. A first via hole 17 is formed to penetrate each of the protrusions 16. The present disclosure provides a water jet device capable of recycling used water, and avoiding water leak, which is therefore safe in use and possesses practical applicability.

The drive unit 11 referred to hereinabove comprises a body 11a and a first fixing plate 11b driven by the body 11a, the first fixing plate 11b having a first magnetic body 18 mounted thereon. A fixing pole 13a is internally formed on the bottom of the base container 10, to which fans 12 are mounted. A second magnetic body 19 is disposed on the fans 12. The body 11a referred to in this embodiment is preferably a motor, which may be secured to the bottom of the base container 10 via a motor shell 11c. The first fixing plate 11b is pivoted to a rotation shaft of the motor. Mounted on the first fixing plate 11b are a number of first magnetic bodies 18, which may be a magnet, and preferably a permanent magnet. On one side of the fans 12 is provided with a second fixing board, with a second magnetic body 19 being disposed thereon. The second magnetic body 19 may be more easily assembled via the second fixing board. When electrified, the motor rotates the first fixing plate 11b using the rotation shaft. As a result of the varied magnetic forces of the rotating first fixing plate 11b, the second magnetic body 19 on the fans 12 starts to rotate, and in turn, causes the second fixing plate to rotate with the fans 12. The thrust and pressure generated by the rotating fans 12 drive water from the inner chamber to the outer chamber where the water is ejected from the nozzle. The faster the motor rotates, the faster the fans rotate. Consequently, the chamber 15 will retain a higher pressure, and thus water will be rejected higher upward.

Further, the first magnetic body 18 and the second magnetic body 19 are disposed to be aligned with each other. If the first magnetic body on the fans 12 is not aligned with the second magnetic body in the drive unit 11, the magnetic forces are likely to confuse each other, which prevent the fans 12 from rotating.

Also externally disposed on the bottom of the base container 10 are light emitting components 20, which are aligned with the first holes 17 on the protrusions 16. In this embodiment, the light emitting component 20 is a colored LED lamp. Each LED lamp is aligned with a via hole penetrating the protrusion 16. When the LED lamps are on, colored beams of light are projected from the first via holes 17, which, together with the water jet, create a water dance in the background of colorful lights. This significantly increases the entertainment effect of the fountain.

The aforesaid device further comprises a first housing 21, which coordinates with the base container 10 to form an airtight room. Preferably, the first housing 21 is buckled together with the base container 10. In this embodiment, the first housing 21 is designed to be the body of a sealed transparent bottle, such that the ejected water will not scatter around and may be recycled for further use to avoid waste of resources. Moreover, this design enables the device to be disposed indoors, making it more useful in practical use. Furthermore, the end of the first housing 21 is detachable such that liquids may be easily introduced into the base container 10.

A baffle 22 is disposed between the first housing 21 and the base container 10, with second via holes 23 being arranged thereon. The second via holes 23 fit with the protrusions, and penetrate the baffle 22. The baffle 22 is disposed to prevent the light emitted by the light emitting component 20 from scattering to the first housing 21 and compromising the water-light show. A space is provided between the protrusions 16 and the second via holes 23, such that the water in the first housing 21 may return to the base container 10.

A protective sheet 24 is retained between the baffle 22 and the cover plate 13. On both sides of the protective sheet 24 are arranged support legs 25. The upper support leg 25 is used for supporting the baffle 22, while the lower support leg 25 keeps contact with the cover plate 13. The relative position between the baffle 22 and the cover plate 13 is fixed by the protective sheet 24. In this embodiment, the protective sheet 24 is preferably shaped like a triangle. Of course, the other shapes may also be applied to the protective sheet. In the present embodiment, the baffle 22 and the cover plate 13 are provided with the protective sheet 24 disposed therebetween. Owing to the protective sheet 24, the pressurized gas generated within the chamber 15 while the fans 12 are rotating do not rush into the first housing 21 through the water jet holes 14. Consequently, it is possible to maintain a proper level of pressure within the chamber 15, and the returning water can pass through the holes 14, and meanwhile reduce resistance on the returning water flow.

Figure 3:
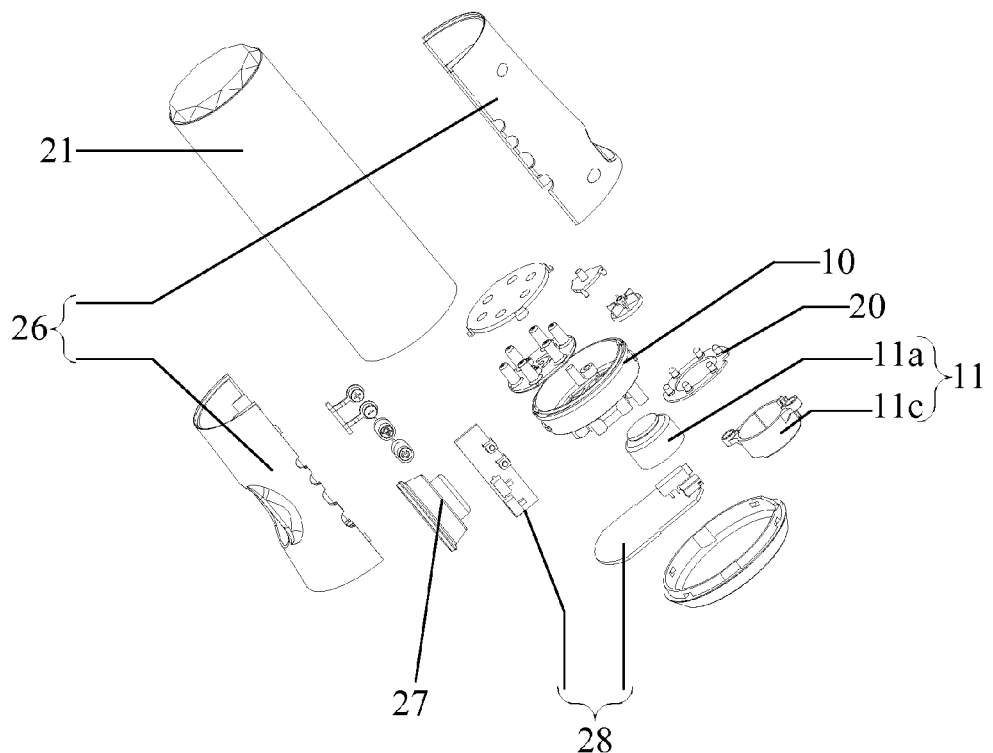
FIG. 3 is a perspective exploded view of a water dance speaker according to one embodiment of the present disclosure.
Figure 4:
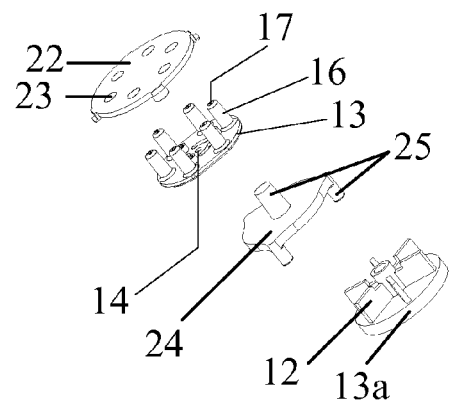
FIG. 4 is a partial perspective exploded view of FIG. 3.
Figure 5:
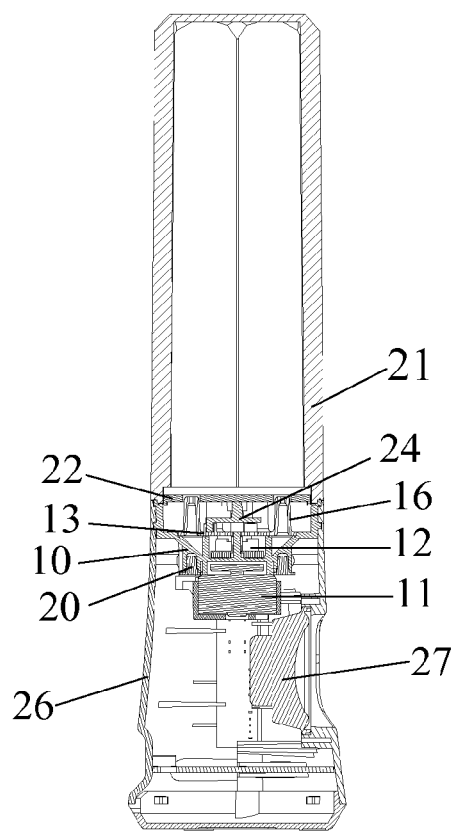
FIG. 5 is an overall view of the water dance speaker according to the present disclosure.

Reference is now made to FIGS. 1, 2, 3, 4 and 5. FIG. 1 is a perspective view of a water jet device according to one embodiment of the present disclosure; FIG. 2 is a perspective exploded view of a water jet device according to another embodiment of the present disclosure; FIG. 3 is a perspective exploded view of a water dance speaker according to one embodiment of the present disclosure; FIG. 4 is a partial perspective exploded view of FIG. 3; and FIG. 5 is an overall view of the water dance speaker according to the present disclosure. Also provided in the present disclosure is a water dance speaker, which comprises a water jet device, and a second housing 26 for accommodating the water jet device. In a preferred embodiment, the second housing 26 is divided into two parts connected mutually via clamping structure or buckle configuration. And a plurality of accommodating holes for accommodating the operation buttons (not shown) are arranged in the connection interface thereof. Of course, the structure of the second housing 26 is not limited to the form of two-part, integral structure or other forms of multi-part may be applied. The second housing 26 comprises a power source interface and a sound hole of a speaker 27. Opposite the sound hole, the speaker 27 is disposed fixedly in the second housing 26 The water jet device is as set forth hereinbefore, so details are omitted. The power source interface may be a USB interface whereby it may be powered by a computer via a data line. Of course, the interface may be a DC interface, and powered via a DC transformer. Alternatively, a rechargeable battery component may be provided such that the water dance speaker is powered by battery.

In particular, the second housing 26 comprises a control circuit module 28 for controlling operations of the water jet device and the speaker 27. The control circuit module 28 has a power input end connected with the power source interface. According to this embodiment, the control circuit module 28 comprises an audio receiving unit, which controls, upon receiving an external audio signal, operations of the drive unit 11 in the water jet device and the operations of the light emitting component 20. This audio receiving unit may be a voice-controlled component or a Bluetooth component. The control circuit module 28 may further comprise an audio reading unit for reading and outputting audio data recorded in a memory card, such as an SM card, TF card, and U disk. Consequently, the water-light dance show may be activated by simply reading a card or inserting a U disk. The voice-controlled component may receive external sounds and, based on the volume of the received sounds, output corresponding control signals to control the drive unit. As a result, the speaker can create water dance effect varied to the melody of an external music or the rhythm of an external sound without connecting to an external sound source, or inserting a card or a U disk. Moreover, the control circuit module 28 may control the light emitting module 20 to flicker based on the melody of an external music or the rhythm of an external sound, and thus create, together with the ejected water, a harmonized and enjoyable water-light show. Of course, the control circuit module 28 may determine, according to circumstances, to simply put on a water show or a light show, or both in an alternating manner. Furthermore, it is possible to enjoy music and the water show over a Bluetooth connection to an external device. A power On/Off button or a volume adjusting button may be configured to control the volume of the water dance to enhance the practical use of the speaker.

By using the water jet device proposed above, the water dance speaker in the present disclosure reduces waste in resources, and prevents water leak, improving the security in use. Besides, the present invention varies the height of the water jet and the light beams emitted from the light emitting module 21 with the rhythm of a music, thereby producing a water dance show in varying and flickering lights. This makes the show more enjoyable and pleasant to the eyes, thus making the present invention more practical in use.

Illustrated above are the preferred embodiments of the present disclosure, which should not be considered limitative to the scope of the invention. Therefore, any equivalent substitutions or variations to the structures or processes disclosed in the specification and the drawing of the present disclosure, or a direct or indirect application of the invention to the other technical fields should be considered as part of the present disclosure.

I claim:

1. A water jet device, comprising:
   a base container, a drive unit and fans driven by the drive unit;
   wherein the drive unit is mounted externally to a bottom of the base container, while the fans are mounted internally to the bottom of the base container;
   wherein a cover plate, disposed on the base container to engage therewith, comprises via holes thereon and coordinates with the base container to form a chamber to contain liquids;
   wherein on the side of the cover plate away from the base container are formed protrusions vertical to the cover plate, a first via hole penetrating each of the protrusions; and
   wherein a protective sheet is retained on the cover plate to prevent pressurized gas generated within the chamber from rushing upward through the via holes when the fans are rotating so as to maintain pressure in the chamber.

2. The water jet device according to claim 1, wherein the drive unit comprises a body and a first fixing plate driven by the body, a first magnetic body being disposed on the first fixing plate; and
   wherein a fixing pole is internally formed on the bottom of the base container and mounted to the fans, a second magnetic body being disposed on the fans.

3. The water jet device according to claim 2, wherein the first magnetic body and the second magnetic body are aligned with each other.

4. The water jet device according to claim 1, wherein a light emitting component is externally mounted to the bottom of the base container, aligned with the first via holes penetrating the protrusions.

5. The water jet device according to claim 4, further comprising a first housing, which coordinates with the base container to form an airtight room.

6. The water jet device according to claim 5, wherein a baffle is provided between the first housing and the base container, a second via hole being disposed on the baffle to running fit with the protrusions and penetrate the baffle.

7. The water jet device according to claim 6, wherein support legs are disposed on both sides of the protective sheet, and between the baffle and the cover plate.

8. The water jet device according to claim 7, wherein the base container and the first housing are both made of a transparent material.

9. The water jet device according to claim 8, wherein the end of the first housing is detachable so as to facilitate introduction of liquids into the base container.

10. A water dance speaker, comprising a water jet device, and a second housing adapted for accommodating the water jet device;

the water jet device comprising:

a base container, a drive unit and fans driven by the drive unit;

wherein the drive unit is mounted externally to a bottom of the base container, while the fans are mounted internally to the bottom of the base container;

wherein a cover plate, disposed on the base container to engage therewith, comprises via holes thereon and coordinates with the base container to form a chamber to contain liquids;

wherein on the side of the cover plate away from the base container are formed protrusions vertical to the cover plate, a first via hole penetrating each of the protrusions; and wherein a protective sheet is retained on the cover plate to prevent pressurized gas generated within the chamber from rushing upward through the via holes when the fans are rotating so as to maintain pressure in the chamber; and the second housing comprising a power source interface and a speaker.

11. The water dance speaker according to claim 10, wherein the second housing comprises a control circuit module adapted for controlling operations of the water jet device and the speaker, the control circuit module comprising a power source input end connected with the power source interface;

wherein the drive unit comprises a body and a first fixing plate driven by the body, a first magnetic body being disposed on the first fixing plate; and wherein a fixing pole is internally formed on the bottom of the base container and mounted to the fans, a second magnetic body being disposed on the fans.

12. The water dance speaker according to claim 11, wherein the water jet device further comprising a first housing, which coordinates with the base container to form an airtight room; and wherein the control circuit module further comprises an audio receiving unit and an audio reading unit, wherein the audio receiving unit is a voice-controlled component or a Bluetooth component, and controls, upon receiving an external audio signal, operations of the drive unit in the water jet device and meanwhile operations of the light emitting component, and the audio reading unit is configured to read audio data from a memory card, the memory card including an SM card, TF card, and U disk.

13. The water dance speaker according to claim 12, Wherein a baffle is provided between the first housing and the base container, a second via hole being disposed on the baffle to running fit with the protrusions and penetrate the baffle.

14. The water dance speaker according to claim 13, wherein support legs are disposed on both sides of the protective sheet, and between the baffle and the cover plate.

15. The water dance speaker according to claim 14, wherein the end of the first housing is detachable so as to facilitate introduction of liquids into the base container.

* * * * *